United States Patent [19]

Staker et al.

[11] Patent Number: 4,762,724

[45] Date of Patent: Aug. 9, 1988

[54] COMPOSITIONS AND PROCESS FOR ALFALFA DRYING

[75] Inventors: Donald D. Staker; William S. Kain, both of Cincinnati, Ohio

[73] Assignee: National Distillers and Chemical Corporation, New York, N.Y.

[21] Appl. No.: 26,090

[22] Filed: Mar. 16, 1987

Related U.S. Application Data

[63] Continuation-in-part of Ser. No. 769,238, Aug. 26, 1985, abandoned.

[51] Int. Cl.$^4$ ................................................. A23K 1/00
[52] U.S. Cl. ....................................... 426/302; 426/636; 426/640; 426/807
[58] Field of Search ............... 426/302, 310, 636, 640, 426/426, 431, 807

[56] References Cited

U.S. PATENT DOCUMENTS

| | | | |
|---|---|---|---|
| 2,198,214 | 4/1940 | Musher | 426/311 |
| 2,227,246 | 12/1940 | Chuck | 426/636 |
| 2,504,159 | 4/1950 | Singer et al. | 426/636 |
| 2,717,207 | 9/1955 | Horvath | 426/636 |
| 4,433,002 | 2/1984 | Zilch | 426/640 |
| 4,556,505 | 12/1985 | Fenn et al. | 426/636 |
| 4,561,995 | 12/1985 | Fenn et al. | 426/636 |

OTHER PUBLICATIONS

Wieghart et al., "Hastening Drying Rate of Cut Alfalfa with Chemical Treatment", J. Anim. Sci., vol. 51, (1980), pp. 1–9.

Wieghart et al., "Acceleration of Alfalfa Drying in the Field by Chemical Application at Cutting", Crop Science, vol. 23, (1983), pp. 225–229.

Tullberg et al., "The Effect of Potassium Carbonate Solution oh the Drying of lucerne, J. Agric. Sci., Camb, vol. 91, (1978), pp. 551–556.

*Primary Examiner*—R. B. Penland
*Attorney, Agent, or Firm*—Kenneth D. Tremain; Gerald A. Baracka

[57] ABSTRACT

Aqueous compositions suitable for the treatment of alfalfa are provided herein. The aqueous compositions contain a hydrocarbon, a lower alkyl ester of a fatty acid and/or alkali metal carbonate. A process for applying said aqueous compositions to the alfalfa at the time of cutting to reduce drying time is also provided.

5 Claims, No Drawings

COMPOSITIONS AND PROCESS FOR ALFALFA DRYING

CROSS-REFERENCE TO RELATED APPLICATION

This is a continuation-in-part of our copending application Ser. No. 769,238, filed Aug. 26, 1985, now abandoned.

BACKGROUND OF THE INVENTION

1. Field of the Invention

The present invention relates to improved aqueous compositions for the treatment of alfalfa and to the process whereby said compositions are applied to alfalfa at cutting to reduce the time required for drying.

2. Description of the Prior Art

Alfalfa is widely grown throughout the United States for hay and forage. It is also cultivated in Europe and Australia where it is known as lucerne. To reduce the length of time cut alfalfa is exposed to the elements and minimize the amount of handling during harvesting, mechanical and chemical treatment methods, or a combination thereof, are used to speed the drying process. By reducing the time cut alfalfa is exposed to the elements, a better colored dried product is obtained and the risk of damage from rain is proportionately reduced. Rain falling on a cut crop leaches out soluble nutrients and, in extreme cases, can lead to mildew or rotting. Reducing the amount of handling during harvesting, decreases the loss of dry matter—which using conventional harvesting procedures is estimated to be as high as 30 percent, and yields a product having higher nutritive value.

Recent work with chemical conditioners has been primarily directed to the use of aqueous potassium carbonate solutions. Treatment with aqueous potassium carbonate solutions has been shown to effectively reduce the drying time of alfalfa and other grasses under a variety of laboratory and field drying conditions. Tullberg and Angus, *J. Agric. Sci.*, Camb, 91, 551–556 (1978), reported that the drying rate of fully exposed individual alfalfa plants was substantially increased by brief immersion in 0.18 M potassium carbonate solution. Wieghart, Thomas, and Tesar (J. Anim. Sci., 51(1), 1–9(1980)) reported significant improvement in the drying rate of cut alfalfa treated in the lab with aqueous solutions containing mixed methyl esters of long chain fatty acids and a surfactant with or without potassium carbonate. Similar improvement in the drying rate of alfalfa in the field was reported by Wieghart, Thomas, Tesar, and Hansen in *Crop Sci.*, 23, 225–229 (1983) using solutions of potassium carbonate alone and in combination with methyl esters of fatty acids and emulsifier.

While significant reduction in the drying time of alfalfa can be obtained using the aforementioned aqueous alkaline methyl ester solutions, there are certain deterrents to the use of such chemical treatments. Foremost in this regard is the cost of the treatment chemicals. Also, aqueous solutions of potassium carbonate are mildly alkaline and attack/corrode the painted metal surfaces of the harvesting machinery. It would be highly advantageous if less costly alkaline treatment solutions were available which were equally or more effective than the heretofore known products. It would be even more advantageous if useful dispersions of these alkaline solutions could be obtained without the use of external emulsifying aids and if the alkaline solutions were less corrosive to the painted metal surfaces of farm machinery.

SUMMARY OF THE INVENTION

These and other advantages are achieved with aqueous compositions which include a small amount of paraffinic or isoparaffinic hydrocarbon or aliphatic alcohol with a nonionic or anionic compound or a combination of such compounds. A lower alkyl ($C_{1-4}$) ester of a fatty acid and alkali metal carbonate is also be present in the composition. When applied to alfalfa, the aqueous compositions significantly reduce the time required for drying and also provide economic and other advantages over the heretofore known chemical conditioners.

While it is known that removal and/or modification of the surface wax of forage grasses is possible by dipping the grass in organic solvents, such as sodium tetrachloride, benzene, or petroleum ether, or by exposing the grass to hot vapors of such solvents, none of the heretofore known procedures utilize aqueous compositions containing a hydrocarbon or suggest that such aqueous compositions can be effectively utilized.

More specifically, the present invention relates to a process for increasing the drying rate of alfalfa which comprises applying an effective amount of an aqueous composition to essentially uniformly coat the alfalfa during cutting, said aqueous composition comprising 65 to 99 weight percent water; hydrocarbon or $C_{1-14}$ aliphatic alcohol; a nonionic or anionic compound; a lower alkyl ester of a $C_{8-22}$ fatty acid or mixture of fatty acids; and potassium or sodium carbonate. Methyl esters of a $C_{12-18}$ fatty acid or a mixture of fatty acids wherein the predominant acids have from 12 to 18 carbon atoms are particularly advantageous.

In an especially useful embodiment of this invention, the fatty acid methyl ester contains free fatty acid, i.e., has a determinable acid value, so that the anionic surface active agent is formed in situ. With this embodiment, useful aqueous dispersions are obtained containing an alkali metal carbonate, paraffinic and/or isoparaffinic hydrocarbon, and methyl ester containing some free fatty acid and without the need for external emulsifying agents. More specifically, these highly useful aqueous compositions contain 85 to 99 weight percent water, 0.10 to 10 weight percent paraffinic and/or isoparaffinic hydrocarbon, 0.25 to 10 weight percent methyl ester of a $C_{12-18}$ fatty acid which has an acid value from 5 to 30, and 0.5 to 5 weight percent potassium or sodium carbonate.

DETAILED DESCRIPTION OF THE INVENTION

This invention relates to improved aqueous compositions, also referred to herein as chemical conditioners, drying aids and drying agents, useful for the treatment of alfalfa and other forage grasses to reduce the time required for drying after cutting. The invention also relates to the process whereby said aqueous compositions are applied to the alfalfa during cutting.

The compositions of this invention are obtained by incorporating (dispersing) a small amount of a hydrocarbon or aliphatic alcohol in water with a lower alkyl ($C_{1-4}$) ester of a fatty acid and an alkali metal compound, such as alkali metal carbonates and alkali metal hydroxides. In formulations containing alkali metal carbonate, it has been observed that aqueous compositions containing hydrocarbon exhibit a reduced tendency to attack/corrode the painted metal surfaces of the harvesting equipment. By utilizing a hydrocarbon it is also possible to reduce the amount of methyl ester in the formulation, thereby reducing the cost of the material. Quite surprisingly, these advantages are obtained without any sacrifice in drying efficiency. In fact, in many instances, it is possible to obtain even faster drying rates with the present chemical conditioners than with heretofore known dehydrating agents. In general, the improved aqueous chemical conditioner compositions of this invention can contain 65 to 99 weight percent water. Weight percentages employed herein are based on the total weight of the composition.

Useful hydrocarbons are liquid products under ambient conditions. While they are most generally obtained by the distillation of petroleum fractions, they may also be derived from synthetic sources such as from the oligomerization of ethylene, propylene, butene-1, octene-1, decene-1 or the like. The hydrocarbons are predominantly paraffinic and/or isoparaffinic. Minor amounts of naphthenic materials may also be present. Especially advantageous hydrocarbons of the above types which can be used include mineral oil, kerosene, liquid petrolatum, mineral spirits, hexane, heptane, hydrogenated oligomers and decene-1. Isopar (trademark) isoparaffinic solvents may also be advantageously utilized.

Aliphatic alcohols which are useful include monohydric alcohols having from 1 to 14 carbon atoms. Such alcohols include methanol, ethanol, isopropanol, n-propanol, n-butanol, t-butanol, n-hexanol, 2-ethylhexanol, decyl alcohol, isodecyl alcohol, isotridecyl alcohol, and the like. It is particularly advantageous when aliphatic alcohols having from 4 to 10 carbon atoms are employed. Mixtures of two or more hydrocarbons, mixtures of two or more alcohols, and mixtures of hydrocarbons and alcohols can be used.

As will be evident, the character of the aqueous composition will vary depending on whether a hydrocarbon, an alcohol or a hydrocarbon/alcohol mixture is utilized. Since most of the useful alcohols are readily compatible with water at the concentrations employed, solutions are obtained in the absence of a fatty acid ester. On the other hand, an emulsion or dispersion is obtained when hydrocarbons are used, depending on the type and concentration of the hydrocarbon and the particular nonionic or anionic compound used. For the purpose of this invention, therefore, the term composition as utilized throughout is intended to encompass solutions, dispersions, and emulsions.

To obtain useful aqueous compositions of the invention, which can be readily applied to the alfalfa during cutting and which uniformly coat the plants and reduce drying time, a nonionic or anionic compound is necessarily present with the hydrocarbon and/or alcohol.

The anionic compounds are known surface active agents which can be added, as such, or generated in situ. Useful anionic surface active compounds which can be employed include: alkali metal soaps of $C_{12-18}$ fatty acids, such as potassium oleate, sodium oleate, potassium soyate and potassium tallate; olefin sulfonates, such as alpha-olefin sulfonates; sulfates of alcohols, such as sodium lauryl ether sulfate; sulfates of ethoxylated alcohols, such as ethoxylated lauryl sulfate; sulfates and sulfonates of ethoxylated alkylphenols, such as the sodium salt of sulfated nonylphenoxy poly(ethyleneoxy)ethanol; sulfates and sulfonates of oils and fatty acids, such as sulfated tallow and sulfated castor oil; sulfates of fatty esters, such as sulfated butyl oleate; sulfonates of alkylaryls, such as sodium dodecylbenzene sulfonate and tributylamine dodecylbenzene sulfonate; sulfonates of benzene, toluene or xylene, such as potassium xylene sulfonate; sulfonates of condensed naphthalene, such as the sodium salt of condensed naphthalene sulfonic acid; and sulfonates of petroleum, such as sodium petroleum sulfonate.

Useful nonionic surface active compounds which can be employed include: ethoxylated $C_{8-18}$ aliphatic alcohols, such as POE (10) oleyl alcohol, POE (20) oleyl ether, POE (20) cetyl ether, and POE (23) lauryl alcohol; ethoxylated $C_{8-12}$ alkylphenols, such as nonylphenoxy poly(ethyleneoxy)ethanol; ethoxylated $C_{12-18}$ fatty acids, such as ethylene glycol monooleate, PEG (400) dioleate, PEG (200) monooleate, PEG (400) sesquioleate, PEG (600) dioleate, PEG (400) monolaurate, and PEG (600) monooleate; ethoxylated $C_{12-18}$ fatty acid esters and oils, such as ethoxylated castor oil, POE (5) sorbitan monooleate; POE (20) sorbitan trioleate, POE (20) sorbitan monooleate, POE (20) sorbitan monopalmitate, POE (20) sorbitan monoisostearate and POE (200) castor oil; glycerol esters, such as glycerol monooleate, glycerol sesquioleate, glycerol dioleate and polyglycerol esters of fatty acids; sorbitol and sorbitan derivatives, such as sorbitan trioleate, sorbitan sesquioleate, and sorbitan monooleate; and ethoxylates of poly(propylene glycol).

The surface active agents insure efficient, uniform wetting of the alfalfa by the aqueous composition during application. Also, when the aqueous compositions are an emulsion or dispersion, the surface active compound(s) function as emulsifying or dispersing agents. The nonionic/anionic surfactant(s) can be present in amounts ranging from 0.01 to 2.5 weight percent but most generally constitutes from 0.05 to 0.5 weight percent of the aqueous composition. Combinations of two or more nonionic and/or anionic compounds can be effectively utilized. Especially useful aqueous compositions are obtained when the surfactant is selected from the group consisting of an alkali metal soap of a $C_{12-18}$ fatty acid, an ethoxylate of a $C_{8-18}$ aliphatic alcohol, an ethoxylate of poly(propylene glycol), an ethoxylate of a $C_{8-12}$ alkylphenol, an ethoxylate of a $C_{12-18}$ fatty acid, and an ethoxylate of a $C_{12-18}$ fatty acid ester. It is particularly advantageous if the ethoxylates contain from 8 to 30 condensed ethylene oxide units. The surfactant can be added directly to the hydrocarbon/alcohol and water or, in some instances, it can be formed in situ.

In a particularly useful embodiment of the invention, the surfactant is a sodium or potassium soap of a $C_{12-18}$ fatty acid or fatty acid mixture which is formed in situ and wherein the predominant acids have from 12 to 18 carbon atoms. These anionic surface active agents are highly efficient and are readily formed in situ when some free fatty acid is present with the methyl ester and when sodium or potassium carbonate is used. To form the alkali metal salt of the fatty acid in situ, the organic phase containing the fatty acid is combined with the aqueous phase containing the alkali metal carbonate under ambient conditions. This technique not only provides a facile preparation of the anionic surfactant but also makes it possible to use beneficial excess of alkali metal carbonate without complicating the blending procedure. Similar procedures can be used for the in situ formation of other anionic surfactants such as alkali metal salts of alkyl benzene sulfonic acids or alkali metal salts of alcohol sulfonates. While not required to obtain useful dispersions, additional surfactants may be added and present with the anionic surfactant which is formed in situ.

The alkali metal carbonate can be potassium or sodium carbonate. Fatty acid esters which can be employed are $C_{1-4}$ alkyl esters of fatty acids having from 8 to 22 carbon atoms. The esters are obtained by conventional esterification techniques using fatty acid(s) obtained via synthetic routes, e.g., oxo or Koch processes or, as is more commonly the case, derived from natural fats and oils. Branched, straight-chain, saturated or unsaturated fatty acids or mixtures of said acids can be used. The ester moiety may also be branched or straight-chain. Illustrative fatty acid esters useful for the invention are the methyl, ethyl, propyl and butyl esters of caproic acid, caprylic acid, capric acid, lauric acid, myristic acid, palmitic acid, stearic acid, isostearic acid, ricinoleic acid, oleic acid, linoleic acid, behenic acid, erucic acid and mixed acids derived from coconut oil, lard oil, tall oil, safflower oil, corn oil, tallow, soybean oil, palm oil, castor oil, rapeseed oil, canola oil and the like. Methyl esters of $C_{12-18}$ fatty acids or mixtures containing predominantly $C_{12-18}$ fatty acids are particularly advantageous.

In the preferred embodiment of this invention the methyl ester contains sufficient free fatty acid to react with the excess alkali metal carbonate to form fatty acid soaps in situ thereby eliminating the need to add external emulsifying agents. These aqueous dehydrating compositions contain from 85 to 99 weight percent water, from 0.10 to 10 weight percent hydrocarbon, from 0.25 to 10 weight percent methyl ester of a $C_{12-18}$ fatty acid having an acid value from 5 to 30, and from 0.5 to 5 weight percent potassium or sodium carbonate. Preferably the hydrocarbons are paraffinic or isoparaffinic hydrocarbons or mixtures thereof and the methyl ester contains free fatty acid so that the acid number is in the range 10 to about 25. If the methyl ester does not contain sufficient free fatty acid, the acid value may be adjusted to the desired level. Expecially advantageous aqueous compositions contain from 90 to 97 weight percent water, 0.25 to 5 weight percent paraffinic or isoparaffinic hydrocarbon, 1 to 5 weight percent methyl ester, and 1 to 5 weight percent potassium or sodium carbonate.

The chemical conditioners are applied to the alfalfa as dilute aqueous solutions, dispersions, or emulsions. The solutions, dispersions, or emulsions can be obtained by separately adding the individual active components to water in the prescribed amount. Conventional agitation is generally sufficient to effect solution, dispersion, or emulsion.

Application of the chemical conditioner is made at the time of cutting. Typically, the aqueous dispersion is sprayed through a series of nozzles mounted along the length of a spray bar or boom in such a way so as to achieve uniform coating of spray on the plant. Application is usually made using moderate to low pressure spray equipment. With improved delivery atomization spray equipment even higher hydrocarbon levels than previously specified could be used, thus making it possible to even further reduce the level of the more costly methyl ester component.

The use of multiple spray bars for application is sometimes desirable, particularly when haybines (mower-conditioners) are employed. In such instances, it may be advantageous to make application of the drying aid both before and after the alfalfa passes through the crimping rolls. In other instances, and especially when conventional mowers are employed, a crop bar is utilized to bend the alfalfa to better expose the stems to insure good coverage of the spray. It is particularly important that the stems of the plant be coated since the stems, due to their heavy waxy coating and bulk, release moisture more slowly than the leaves and thus derive the most benefit from such chemical treatments.

The amount of aqueous conditioner applied will depend on the condition of the particular crop and drying conditions. Typically, the rate of application will range between 2 and 16 pounds of active product per acre, on a water-free basis.

The following examples illustrate the aqueous compositions of the invention and the improved results obtained therewith more fully. In these examples, all parts and percentages are on a weight basis unless otherwise indicated. Drying times were determined in the laboratory using field grown alfalfa plants trimmed to 8–10" lengths. The plants were tied in bunches weighing approximately 25 grams each and two grams of the aqueous composition uniformly applied to each bunch using a mist sprayer. After treatment, the bunches were suspended from racks and allowed to air dry to 25 percent residual moisture. The moisture content was determined by periodically weighing the test specimens. Duplicate samples were used for the determinations. The average drying time was recorded and compared against the drying time obtained for a control, i.e., bunches treated with water only (2 grams). Unless specified otherwise, percent reduction figures cited throughout the examples are based on the control.

EXAMPLE I

An aqueous emulsion containing 0.5 percent decane isomers (a by-product from the oligomerization of decene-1), 1.5 percent methyl soyate and 2 percent POE (20) sorbitan trioleate was prepared. When applied to alfalfa, the composition gave a 58 percent reduction in the drying time as compared to the control treated with water only.

EXAMPLE II

An aqueous dispersion was prepared containing 2 percent odorless mineral spirits and 2 percent POE (20) sorbitan trioleate and used for the treatment of alfalfa. A 46 percent reduction in the time required to dry the alfalfa to 25 percent residual moisture was obtained upon treatment with the above formulation whereas only 34 percent reduction was obtained when the mineral spirits was omitted.

EXAMPLE III

To demonstrate the ability to obtain useful aqueous compositions wherein the anionic surface active agent is formed in situ, an aqueous dispersion containing 1.86 percent kerosene, 0.14 percent commercial oleic acid, and 2 percent potassium carbonate was prepared. The amount of oleic acid was calculated to provide approximately 0.16 weight percent potassium oleate. Alfalfa treated with the resulting dispersion dried to a 25 percent moisture content in 22.4 hours whereas the control (alfalfa treated with water only) required 47.25 hours to reach the same moisture level. This represents a 53 percent reduction in drying time.

EXAMPLE IV

Following the procedure of Example III, an aqueous dispersion containing 1.86 percent No. 2 diesel fuel, 0.14 percent oleic acid, and 2 percent potassium carbonate was prepared and applied to alfalfa. The alfalfa dried in an average time of 22.75 hours—only 52 percent of the drying time required for the control.

EXAMPLE V

Following the procedure of Example III, an aqueous solution containing 1.86 percent n-octanol, 0.14 percent oleic acid and 2 percent potassium carbonate was prepared and employed for the treatment of alfalfa in the customary manner. The alfalfa treated therewith dried to a 25 percent moisture level in 15.25 hours whereas the control required 39.5 hours to reach the same moisture content. This represents a 61 percent reduction in drying time.

EXAMPLE VI

Following the procedure of Example III, an aqueous dispersion was prepared containing 1.86 percent decane isomers obtained from the oligomerization of decene-1, 0.14 percent oleic acid and 2 percent potassium carbonate. Alfalfa treated with the above-formulated aqueous dispersion showed a 74 percent reduction in drying time as compared to the water-treated control.

EXAMPLE VII

To demonstrate the ability to obtain useful aqueous dehydrating compositions in accordance with the preferred mode of operation, that is, utilizing a hydrocarbon, a methyl ester and alkali metal carbonate but without the use of external emulsifying agents, an aqueous dispersion comparable to that prepared in Example III was prepared replacing a portion of the hydrocarbon with methyl soyate. The acid value of the methyl soyate was adjusted to 28 by the addition of oleic acid. The aqueous dispersion contained 96 percent water, 0.93 percent kerosene, 1.07 percent methyl soyate (AV 28) and 2 percent potassium carbonate. Alfalfa treated with the resulting aqueous dispersion dried to 25 percent moisture content in 7.5 hours whereas the control required 46 hours to dry to the same moisture level. This represents an 84 percent reduction in drying time over the control. Alfalfa treated with a similar formulation containing 96 percent water, 0.5 percent kerosene, 1.50 percent methyl soyate (AV 20) and 2 percent potassium carbonate required 8.5 hours to each the same moisture level—an 82 percent reduction in drying time.

In both instances the drying time was substantially less than that obtained with the product of Example III which did not contain both hydrocarbon and methyl ester. Also, alfalfa treated with an aqueous dispersion which did not contain any hydrocarbon (96 percent water, 2 percent methyl soyate and 2 percent potassium carbonate) required 10.25 hours to reach a 25 percent moisture level. It is apparent that the length of time required to dry alfalfa treated with aqueous dehydrating compositions containing both hydrocarbon and methyl ester is less than that required using dispersions formulated with hydrocarbon alone or methyl ester alone. Moreover, by replacing a portion of the methyl ester in the prior art formulations with a hydrocarbon, the formulator can realize a reduction in cost without any sacrifice in performance and, in some cases, with improved performance.

EXAMPLE VIII

To demonstrate further variation of the formulation, an aqueous dispersion was prepared following the general procedure of Example VII. The aqueous dispersion contained 96 percent water, 0.2 percent kerosene, 1.80 percent methyl soyate (AV 14) and 2 percent potassium carbonate. Upon application to alfalfa, the dispersion provided 71 percent reduction in drying time as compared to the water control. Alfalfa treated with this formulation required 13.1 hours to reach the desired 25 percent moisture level whereas the control required 46 hours to achieve the same moisture content.

EXAMPLES IX-XI

Similar to the procedure described in Example VII, aqueous dispersions were prepared utilizing various alcohols. Each of the formulations contained 0.5 percent of the alcohol, 1.5 percent methyl soyate containing 7% free fatty acids (AV 20) and 2 percent potassium carbonate. Results obtained were as follows:

| Example No. | Alcohol Used | Hours to 25% Moisture | Percent Reduction in Drying Time |
|---|---|---|---|
| IX | n-butanol | 10.75 | 73 |
| X | n-octanol | 9.75 | 75 |
| XI | $C_{12-14}$ aliphatic alcohols | 10.1 | 76 |

EXAMPLE XII

Alfalfa was sprayed with an aqueous dispersion containing 96 percent water, 0.5 percent decane isomers obtained from the oligomerization of decene-1, 1.5 percent methyl soyate, containing 6.6 percent oleic acid and having an acid value of 20, and 2 percent potassium carbonate. The amount of oleic acid in the methyl ester was calculated to provide approximately 0.11 weight percent potassium oleate. Only 7.25 hours was required to obtain 25 percent residual moisture in the alfalfa using the formulation of this example—an 83 percent reduction in drying time.

EXAMPLE XIII

An aqueous dispersion containing 96 percent water, 0.5 percent No. 2 diesel fuel, 1.5 percent methyl soyate (AV 19), and 2 percent potassium carbonate was prepared and upon application to alfalfa yielded an 80 percent reduction in drying time. Alfalfa treated with the control required 46 hours to reach the desired 25 percent moisture content whereas the alfalfa treated with the aqueous dehydrating agent of the present invention dried to the same moisture level in only 9 hours.

EXAMPLE XIV

An aqueous dispersion containing 96 percent water, 0.5 percent odorless mineral spirits, 1.5 percent methyl soyate (AV 19), and 2 percent potassium carbonate was prepared. Alfalfa treated with the resulting dispersion was dried to 25 percent moisture content in 7 hours whereas the control required 46 hours to reach the same moisture level. This represents an 85 percent reduction in drying time.

EXAMPLE XV

To demonstrate the further advantages of the aqueous compositions of this invention, an alkaline chemical conditioner of the type reported in the prior art for the treatment of alfalfa comprised of 1.86 percent methyl esters of soya fatty acids, 0.14 percent oleic acid and 2 percent potassium carbonate was compared with a comparable aqueous composition wherein the methyl soyate was replaced with kerosene for corrosivity to painted metal surfaces. For the comparison, 1 by 4 inch coupons were cut from standard steel strip painted on one side with an alkyd coating and on the other side with an epoxy coating and suspended in the two alkaline prior art aqueous formulations. After 18 days, the central portion of the coupons were visually inspected for defects. Defects present along the cut edges of the coupon were disregarded. While there were no noticeable defects on the epoxy-coated side of the coupon suspended in the alakaline aqueous formulation prepared using the kerosene, several pinhole-size rust spots were observed on the epoxy-coated surface of the coupon suspended in the prior art alkaline aqueous composition prepared using the methyl ester. The effect on the alkyd coating was even more pronounced. The alkyd painted surface of the coupon suspended in the prior art aqueous composition was roughened with significant wrinkling. No roughening or wrinkling was evident on the alkyd surface of the coupon suspended in the alkaline aqueous composition which contained the hydrocarbon.

We claim:

1. A process for increasing the drying rate of alfalfa which comprises applying an effective amount of an aqueous composition to essentially uniformly coat the alfalfa during cutting, said aqueous composition consisting essentially of
   (a) 85 to 99 weight percent water;
   (b) 0.10 to 10 weight percent paraffinic or isoparaffinic hydrocarbon;
   (c) 0.25 to 10 weight percent methyl ester of a $C_{12-18}$ fatty acid or fatty acid mixture wherein the predominant acids have from 12 to 18 carbon atoms, said methyl ester having an acid value from 5 to 30; and
   (d) 0.5 to 5 weight percent potassium or sodium carbonate.

2. The process of claim 1 wherein the paraffinic or isoparaffinic hydrocarbon is selected from the group consisting of mineral oil, kerosene, liquid petrolatum, mineral spirits, hexane, heptane, and hydrogented oligomers of decene-1.

3. The process of claim 2 wherein the methyl ester has an acid value of 10 to 25.

4. The process of claim 3 wherein (a) is present in an amount from 90 to 97 weight percent, (b) is present in an amount from 0.25 to 5 weight percent, (c) is present in an amount from 1 to 5 weight percent, and (d) is present in an amount from 1 to 5 weight percent.

5. The process of claim 4 wherein the aqueous composition is applied at a rate between 2 and 16 pounds of active product per acre, on a water-free basis.

* * * * *